Figure 1:
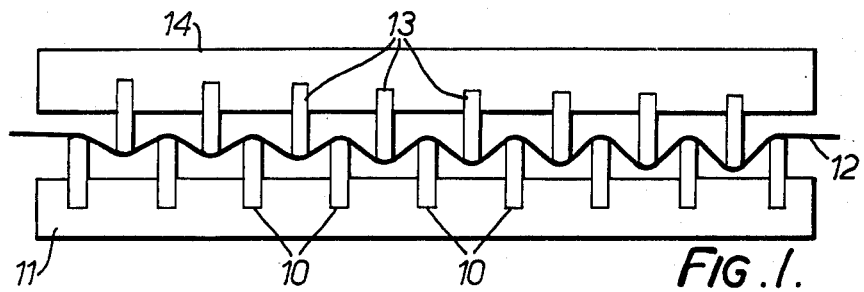

United States Patent [19]

Fraser

[11] 4,136,630
[45] Jan. 30, 1979

[54] SAIL BATTEN
[76] Inventor: Ian K. Fraser, Bracken, Cosawes, Perranarworthal, Truro, Cornwall, England
[21] Appl. No.: 862,965
[22] Filed: Dec. 21, 1977

Related U.S. Application Data
[62] Division of Ser. No. 699,077, Jun. 23, 1976, abandoned.

[30] Foreign Application Priority Data
Jun. 26, 1975 [GB] United Kingdom ............... 27101/75

[51] Int. Cl.² .............................................. B63H 9/06
[52] U.S. Cl. .................................. 114/102; 114/103; 428/182
[58] Field of Search .................... 114/102, 103, 39; 52/309.15, 630, 716; 428/72, 116, 119, 166, 73, 171, 172, 179, 182, 186, 188, 122, 180

[56] References Cited
U.S. PATENT DOCUMENTS

| 2,102,936 | 12/1937 | Bailey | 428/122 |
|---|---|---|---|
| 2,299,595 | 10/1942 | Rydquist | 428/122 |
| 2,608,172 | 8/1952 | Biun | 114/103 |
| 3,581,698 | 6/1971 | Bete | 114/103 |
| 3,674,620 | 7/1972 | McCarthy | 428/293 |
| 3,682,762 | 8/1972 | Blanc | 428/182 |
| 3,691,002 | 9/1972 | Blandy | 428/182 |
| 3,905,321 | 9/1975 | Blythe, Jr. | 114/103 |
| 4,020,207 | 4/1977 | Alfter et al. | 428/182 |
| 4,044,702 | 8/1977 | Jamieson | 114/103 |

FOREIGN PATENT DOCUMENTS 1562921 1/1968 France.
2240144 3/1975 France ..................................... 114/103

*Primary Examiner*—Stanley S. Silverman
*Attorney, Agent, or Firm*—Young & Thompson

[57] ABSTRACT

A tapered sail batten comprises two external generally flat sheets, and an interposed corrugated core sheet, formed of a fiber reinforced synthetic plastic material. The depth of the corrugations in the core sheet increases progressively from end to end of the sheet, and the two external sheets are bonded to the peaks of the corrugations. The batten is elongated and the corrugations are transverse to the length of the batten.

1 Claim, 10 Drawing Figures

SAIL BATTEN

This application is a division of my copending application Ser. No. 699,077, filed June 23, 1976 now abandoned.

This invention relates to a lightweight material having various useful properties, and to components, elements and constructions formed therefrom.

Some commonly used lightweight materials are foamed synthetic plastics, such as polyurethane or polystyrene, usually with an external skin or surface sheet extending around part or the whole of the external surface. Foam materials of this type are frequently used in the construction of boat hulls, furniture, architectural and building materials, and a wide variety of articles of every day use. Although the material has many desirable qualities it is not satisfactory for all purposes, and in particular, it is usually relatively rigid and brittle, subject to local damage by impact, weak in bending and often relatively expensive and quite heavy. Accordingly it is an object of the invention to provide an improved lightweight material having various desirable properties, and also improved methods of manufacturing resulting materials and articles therefrom.

Broadly stated from one aspect the invention consists in a method of constructing an element or material comprising two external sheets or laminates and an internal corrugated or non-planar core sheet, in which the core sheet is formed of a fibre reinforced synthetic plastic material, the moist flexible core sheet being deformed over one or more formers into the required shape, caused or allowed to harden and then attached to the external sheets.

In one example of the invention the moist impregnated core sheet is formed over a series of spaced generally parallel formers, to provide a corrugated effect. The core sheet may be deformed by introducing further formers from the opposite direction into gaps between the first mentioned formers.

According to a preferred feature of the invention the thickness dimension of the core sheet is made to vary at different positions over its length or area. For example it may be tapered.

The external sheets are preferably attached to the core sheet by means of an adhesive or synthetic resin bonding agent, and conveniently the multiple sandwich construction is held together during bonding by applying vacuum.

The invention also consists in a material or construction formed from a material produced by the method as defined above.

Figure 2:
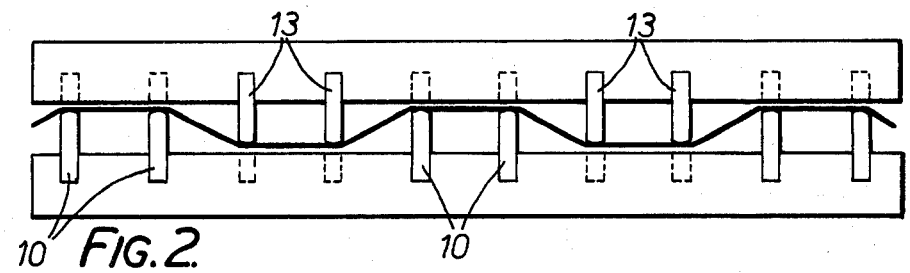
Figure 3:
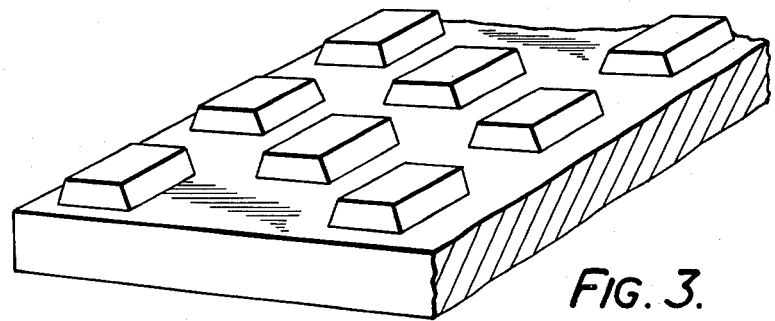
Figure 4:
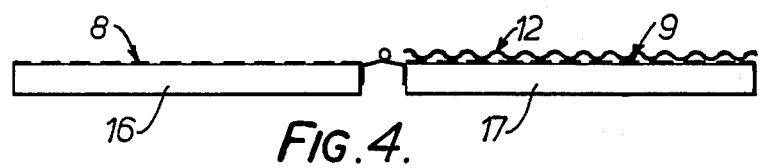
Figure 5:
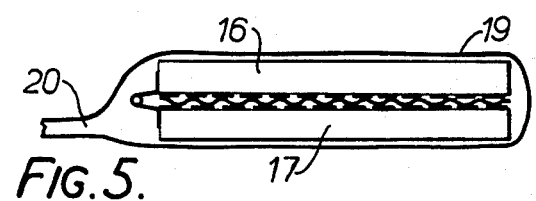
Figure 6:
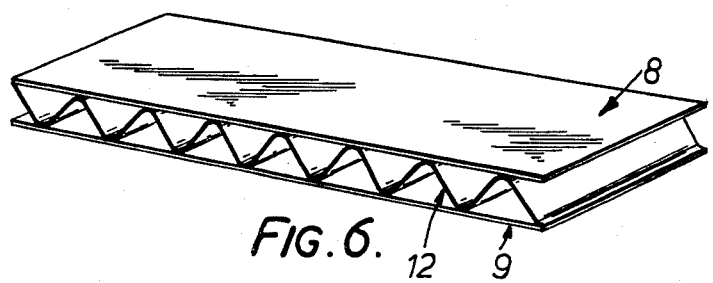
Figure 7:
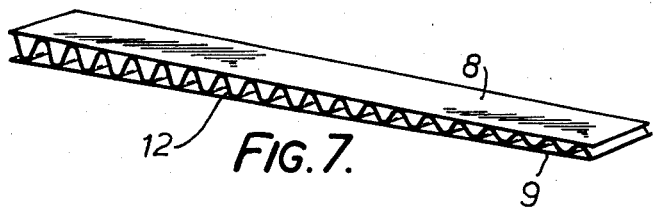
Figure 8:
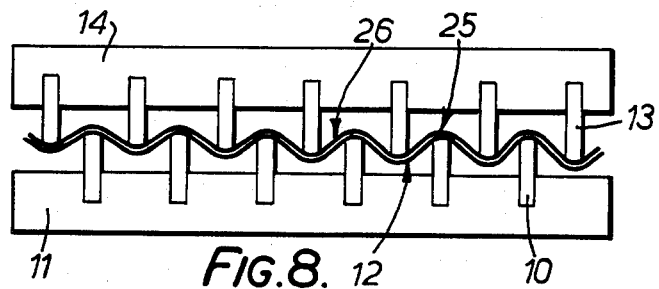
Figure 9:
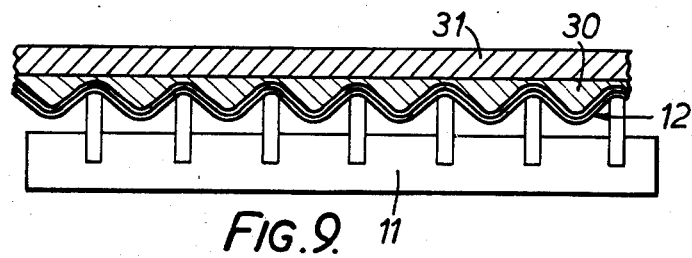
Figure 10:
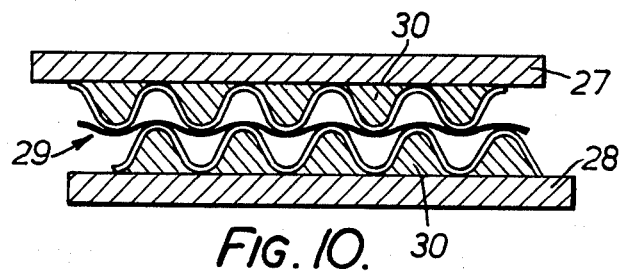

The invention may be performed in various ways and one specific embodiment with a number of possible modifications will now be described by way of example with reference to the accompanying drawings in which:

FIG. 1 is a diagrammatic side elevation illustrating a process for forming a corrugated fibre-reinforced core sheet, FIG. 2 is a similar side elevation illustrating an alternative type of corrugating deformation, FIG. 3 is a diagrammatic perspective view illustrating a three dimensional "waffle plate" formation, FIG. 4 is a diagrammatic side elevation illustrating the first stage in the final assembly of the three sheet materials, FIG. 5 is another diagram illustrating the vacuum stage of the final assembly, FIG. 6 is a diagrammatic view illustrating part of a novel lightweight material produced in accordance with the invention, FIG. 7 is a fragmentary view of part of a sail batten produced by the invention, and FIGS. 8, 9 and 10 are diagrammatic side elevations illustrating three stages in the manufacture of a corrugated core sheet by a different process.

In the first example to be described the composite sheet material is formed from two external sheets 8,9 of glass fibre-reinforced polyester resin (see FIG. 6) and an internal corrugated core sheet 12 also formed of the same material. The first stage of manufacture, as shown in FIG. 1, is to take a glass fibre mat 12, of either chopped strand or continuous strand type, impregnate this mat in the usual manner with liquid polyester resin and then drape the pliable mat or sheet over a forming bed comprising a large number of parallel steel bars 10 located in slots in a pair or side frames 11. A further series of parallel steel bars 13 are located in an upper frame having side members 14, and this upper frame is gently lowered to bring the top bars 13 into slight overlapping relationship with the bottom bars 10. Alternatively the bars 13 may be moved individually, in sequence, into position. As illustrated in FIG. 1 the degree of vertical overlap between the bars 10 and 13 may increase progressively from one end to the other, thus providing a progressive increase in the depth of the corrugations formed in the core sheet 12.

Having deformed the core sheet 12 as required, it is then caused or allowed to harden, for example by applying heat, and the bars and frames 11,14 are then opened and the rigid corrugated sheet 12 removed. The two flat external sheets 8,9 are then prepared to any required material specification, and in this example they are both formed also of a fibre glass mat impregnated with polyester resin and having a decorative "gel coat" on one external face. As illustrated in FIGS. 4 and 5 the two external sheets 8,9, are laid flat on a pair of platens 16,17 (which may be the same forming surfaces on which the sheets 8,9 were originally prepared. Their adjacent or inner faces may, if needed, be coated with a liquid polyester resin or other bonding agent, but this is not necessary if the wet laminate core sheet 12 is itself capable of providing the bonding action. The corrugated core sheet 12 while still moist and flexible, is laid on one sheet 9, and the two platens 16,17 are then folded or hinged together to form the triple-layer sandwich construction as shown in FIG. 6. A partial vacuum is then created in the central zone to cause the wet outer "skins" 8 and 9 to bed down firmly on the peaks of the corrugations of the core sheet 12. This may be achieved as shown in FIG. 5 by means of a flexible bag 19 surrounding the whole structure and connected to an exhaust or suction tube 20. Alternatively an adhesive tape may be applied around the edges of both sheets 8,9 or both platens 16,17, to create a sealed vacuum enclosure which is connected to the suction tube. After the bonding agent between the sheets 8,9, 12 has set solid, the vacuum enclosure is opened and the triple layer construction material removed. It may then be cut to shape, and may have edge "trim" elements fitted and, if required, the internal voids and cavities around the corrugated core sheet 12 may be filled with a rigid foam or other light-weight material.

FIG. 2 illustrates the method of forming corrugations of different profile in the core sheet 12. The steel rods or blades 10,13, in the top and bottom frames 11,14 can be removed and shifted to different positions or replaced by other blades. For example as shown in FIG. 2 by grouping the blades 10,13, in pairs, and omitting some of the blades as shown, a more open corrugated profile is achieved.

A further possible method of producing a corrugated or pre-formed core sheet is illustrated in FIGS. 8, 9 and 10. This is applicable especially when relatively large numbers of one particular corrugation shape are required. In this method the two sets of former bars or blades 10,13, are set up in the frames 11,14, and overlapped as in the previous example, with an impregnated fibre sheet or reinforced fibre mat 25 trapped between the two sets. Attached to this mat is a Melanex (Trade Mark) release surface layer 26 which is stuck to the mat. When the resin impregnated mat 25 has hardened, a rigid mould 30 is then built on the back of the Melanex surface and reinforced, as necessary, with timber or metal frame elements 31, as illustrated in FIG. 9. Two such moulds 30 are constructed of identical section and in the production process as illustrated in FIG. 10 the two mould carriers 27,28 are brought together with the impregnated wet laminate or mat 29 between, and clamped in the required position, being prevented from closing fully by suitable spacers (not shown) around the edges of the two moulds. The mat 29 only touches the tops of the corrugations of the two moulds 30, but the depth of corrugation can be controlled as required.

When the impregnated mat 29 has hardened it is bonded between outer sheets 8,9, in the same way as described previously with reference to FIGS. 4 and 5. In general the invention provides for very accurate control of the taper created by varying the depth of corrugation, and is of particular advantage in the construction of controlled bending elements such as sail battens.

Instead of glass fibre materials other reinforcing fibres may be used such as carbon, stainless steel, asbestos, or "Kevlar" (Registered Trade Mark). Instead of chopped strand material a woven or felted mat may be used, and instead of a polyester resin an epoxy resin or other suitable synthetic plastic material can also be used. Moreover instead of fibre reinforced materials for the outer sheets these may be formed, for example, of thin metal sheets, e.g. of aluminium, or of thin plywood, glass or other materials.

I claim:

1. A flexible tapered sail batten, comprising two external generally flat sheets, and an interposed corrugated core sheet, formed of a fibre reinforced synthetic plastics material, the depth of the corrugations in said core sheet increasing progressively from end to end of said sheet, and the two external sheets being bonded to the peaks of said corrugations, the batten being elongated and the corrugations being transverse to the length of the batten.

* * * * *